Figure 1:
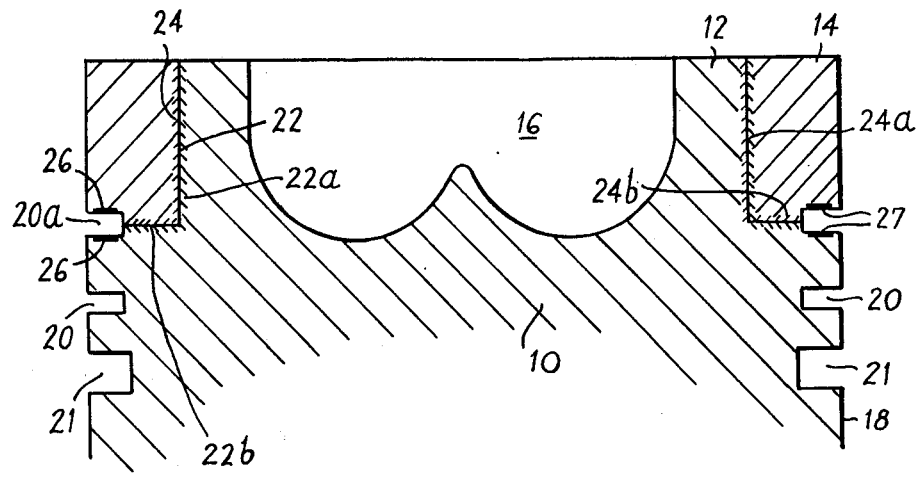

United States Patent [19]
Hill et al.

[11] 3,914,574
[45] Oct. 21, 1975

[54] FABRICATED PISTON WITH SPRAYED GROOVE

[75] Inventors: Harold Taylor Hill; Robert Munro, both of Lyminton, England

[73] Assignee: Wellworthy Limited, Lymington, England

[22] Filed: Oct. 1, 1973

[21] Appl. No.: 402,104

[52] U.S. Cl. .......... 219/121 EM; 29/156.5; 29/458; 92/213; 92/260; 277/189.5
[51] Int. Cl.². B23K 15/00; B23P 15/10; F16J 1/00
[58] Field of Search ............ 92/213, 231, 260, 222; 123/193 P; 29/156.5 R, 458, 475; 277/189.5; 219/121 EM

[56] References Cited
UNITED STATES PATENTS

| | | | |
|---|---|---|---|
| 2,996,342 | 8/1961 | Daub | 277/189.5 |
| 3,095,204 | 6/1963 | Neely | 277/189.5 |
| 3,120,967 | 2/1964 | Kazienko | 29/458 X |
| 3,190,273 | 6/1965 | Bachle et al. | 92/231 X |
| 3,319,536 | 5/1967 | Kohl et al. | 92/231 |
| 3,354,793 | 11/1967 | Meier et al. | 92/213 X |
| 3,422,320 | 1/1969 | Woodling | 29/458 X |
| 3,596,571 | 8/1971 | Hill et al. | 92/231 X |
| 3,715,790 | 2/1973 | Reinberger | 277/189.5 X |

FOREIGN PATENTS OR APPLICATIONS

| | | | |
|---|---|---|---|
| 180,959 | 6/1922 | United Kingdom | 92/216 |
| 558,562 | 1/1944 | United Kingdom | 277/189.5 |

*Primary Examiner*—Irwin C. Cohen
*Attorney, Agent, or Firm*—Brisebois & Kruger

[57] ABSTRACT

This invention relates to a light-metal piston and a method of making the same. The piston having at least one circumferentially-extending ring groove, and is made of at least two parts fastened together, each part defining a part of the piston ring groove and at least one flank of the groove being provided with a wear-resistant coating.

7 Claims, 5 Drawing Figures

FABRICATED PISTON WITH SPRAYED GROOVE

This invention relates to light metal pistons, particularly but not exclusively for use in internal combustion engines.

According to one aspect of the present invention, a method of manufacturing a light metal piston having at least one circumferentially extending ring groove comprises producing the piston in at least two parts each of which includes substantially the whole of a respective side face of the groove, applying a wear-resistant coating to at least one of said side faces, and then joining the parts together to form the piston.

Where there is more than one groove, the two parts preferably each include substantially the whole of a respective side face of the groove nearest to the head of the piston.

According to another aspect of the present invention, a method of manufacturing a light metal piston having n circumferentially extending ring grooves each to be provided with a wear-resistant coating, comprises producing the piston in n+1 parts which are arranged to contact each other along respective circumferential lines lying wholly within or closely adjacent to the base of each groove, applying the wear-resistant coating to at least one side face of each groove, and then joining the parts together to form the piston.

The wear-resistant coating, which may be of cast iron, chromium, molybdenum or nickel, is preferably applied to both side faces of the or each groove. It is applied by spraying, for example plasma spraying.

The parts may be joined together at respective mating surfaces thereof, at least one of the mating surfaces having a circumferentially extending recess therein, whereby to form an annular cavity in the piston when the parts are joined together. The mating surface or surfaces containing the recess or recesses preferably include portions which intersect the external surface of the piston so as to be accessible for electron beam welding, but which do not intersect the cavity.

The parts may comprise a main piston body part having a reduced diameter portion at its head end and one or more annular parts adapted to fit over the reduced diameter portion. The main piston body part may be a casting or a forging, while the annular part or parts are preferably castings.

The invention also includes a light metal piston made by a method in accordance with any of the preceding statements of invention.

Figure 2:
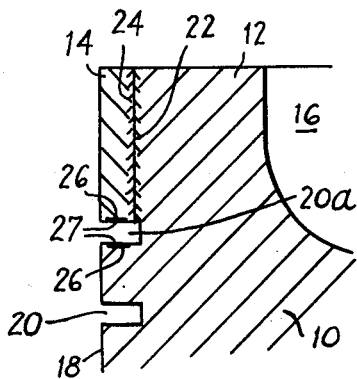
Figure 3:
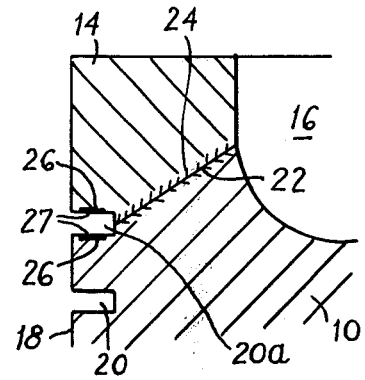
Figure 4:
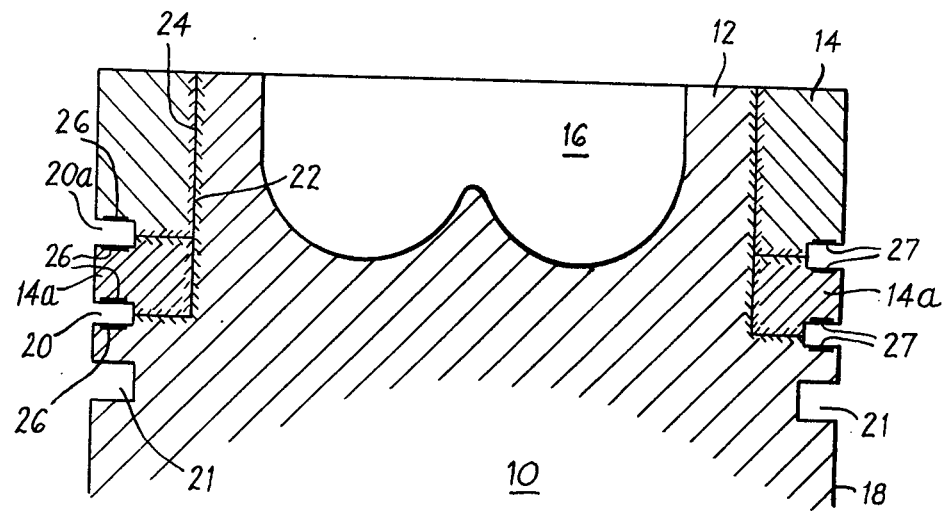
Figure 5:
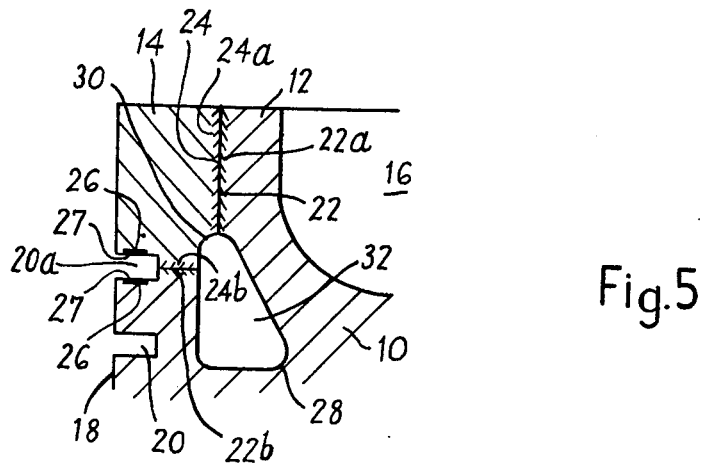

The invention will now be described, by way of non-limitative example only, with reference to the accompanying drawings, of which FIGS. 1 to 3 are sectional views of three different embodiments of light metal pistons for compression-ignition engines, each made in two parts by a method in accordance with the present invention;

FIG. 4 is a sectional view of a light metal piston made in three parts by a method in accordance with the present invention; and FIG. 5 is a sectional view of a light metal piston having a cooling cavity, made by a method in accordance with the present invention.

The piston shown in FIG. 1 is made in two parts, namely a main body part 10 which is produced by casting or forging and which has a reduced-diameter portion 12 at its head end, and an annular part 14 whose external diameter is equal to the external diameter of the body part 10 and which fits closely over the reduced diameter portion 12. The part 14 is preferably a casting.

The body part 10 includes a combustion recess 16 in its head end, and further includes the piston skirt 18 and the gudgeon pin bosses (not shown). The skirt 18 is provided with two circumferentially extending piston ring grooves 20, 21, of which the groove 20 nearer to the head end of the piston is intended for a compression ring while the other groove 21 is intended for an oil control ring.

The body part 10 has a mating surface 22 which is adapted to contact a corresponding mating surface 24 on the annular part 14 when the two parts 10, 14 are fitted together. The mating surface 22 comprises a cylindrical portion 22a coaxial with the body part 10, constituted by the radially outer surface of the reduced diameter portion 12, and an annular portion 22b which is also coaxial with the body part 10 but which lies in a plane perpendicular to the axis of the part 10, constituted by the surface of the shoulder defined between the reduced diameter portion 12 and the remainder of the body part 10. Similarly, the mating surface 24 comprises two portions 24a, 24b, which are respectively constituted by the internal surface of the annular part 14 and the radially extending surface of the annular part 14 nearer to the skirt 18.

The radially outer edges of the portions 22b and 24b are both similarly relieved about their entire circumferences so as to form a further piston ring groove 20a when the parts 10, 14 are fitted together. Thus each of the parts 10, 14 includes the whole of a respective side face of the groove 20a, and the mating surfaces 22b, 24b contact each other along a circumferential line running round the middle of the base of the groove.

It will be appreciated that the groove 20a, which is intended for a further compression ring, is closer to the head end of the piston than are the grooves 20, 21. As a result, the compression ring in the groove 20a is subjected to greater working loads than the rings in the other grooves. Before the parts 10, 14 are fitted together, therefore, the side faces 26 of the groove 20a are plasma sprayed with a wear-resistant coating 27, preferably of cast iron, chromium, molybdenum or nickel. Since the parts 10, 14 are not fitted together at this stage, they may be separately mounted in any convenient manner for the spraying process, and the spraying device may be suitably aligned with each side face 26 so as to produce a uniform coating of even thickness.

The two parts 10, 14 are then fitted together with their respective mating surfaces 22, 24 in intimate contact and, if necessary, held in a jig while the portions 22a and 24a are electron beam welded together and the portions 22b and 24b are electron beam welded together: the weld lines are shown by fine cross-hatching in the drawing.

The pistons shown in the remaining Figures are similar to the piston of FIG. 1, so similar parts will be given the same reference numerals and only the points of difference will be described.

The diameter of the portion 12 of the piston of FIG. 2 is made slightly greater than (as shown), or equal to, the diameter of the base of the groove 20a, thus eliminating the portions 22b, 24b respectively of the mating surfaces 22, 24. The parts 10, 14 therefore still each include substantially the whole of a respective side face of the groove 20a, but only one weld is necessary to join the parts together.

In the piston of FIG. 3, the mating surfaces 22, 24 are substantially frusto-conical, and converge towards the head end of the piston. They extend from a circumferential line around the middle of the base of the groove 20a to a circumferential line around the surface of the combustion recess 16. Again, only one weld is necessary to join the parts 10, 14 together.

If it is desired to provide wear-resistant coatings on the side faces of both of the compression ring grooves 20 and 20a, the three-part construction of FIG. 4 may be adopted. In this construction, the reduced diameter portion 12 of the main body part 10 is extended from the head end of the piston to a plane through a circumferential line around the middle of the base of the groove 20, and a further annular part 14a which fits between the main body part 10 and the part 14 is produced. The part 14a thus includes the whole of one side face of each of the grooves 20, 20a, while the other side face of the groove 20 is included on the part 10 and the other side face of the groove 20a is included on the part 14. The parts 10, 14, 14a are then coated as described with reference to FIG. 1 and electron beam welded together in three welding operations.

It will be appreciated that the construction of FIG. 4 can readily be extended to permit any number of grooves to be provided with a wear-resistant coating. In general, if it is required to provide n grooves with wear-resistant coatings, the piston should be produced in n+1 parts, the divisions between the parts lying along circumferential lines lying wholly within or closely adjacent to the respective bases of the grooves.

In the FIG. 5 embodiment of the invention, the mating surfaces 22, 24 are provided with correspondingly positioned circumferentially extending recesses 28, 30 respectively. When the parts 10, 14 are welded together, therefore, these recesses form an annular cavity 32 which is coaxial with the piston and which surrounds the combustion recess 16. The cavity 32 can be arranged in use to be supplied with a flow of a coolant such as oil, or can be filled with a suitable coolant, for example a metal, such as sodium, which is a liquid at the normal operating temperatures of the piston.

If it is desired that the electron beam used in the welding process should not penetrate the cavity 32, the cavity may be positioned wholly in the portions 22a, 24a of the mating surfaces 22, 24 and spaced a small distance towards the head end of the piston from the plane containing the portions 22b, 24b. Also, the portions 22a, 24a can each be provided with a corresponding circumferentially extending radial step spaced a small distance towards the head end of the piston from the cavity 32. Thus the portions of the mating surfaces 22, 24 which intersect the external surface of the piston so as to be accessible for electron beam welding, i.e. the portions 22b, 24b and those parts of the portions 22a, 24a on the piston head side of the step, do not intersect the cavity 32. The parts of the portions 22a, 24a on the skirt side of the step do intersect the cavity, but are not welded together: they are, however, relatively short.

The methods of manufacturing pistons hereinbefore described have several advantages. Since the piston is made in two or more parts, with each side face of the first compression-ring groove, or of any one of the compression-ring grooves, on a separate part, the side faces are all readily accessible and it is therefore relatively easy to apply a wear-resistant coating of uniform thickness to them before assembly of the parts. This is still true if the coating is applied by methods other than plasma spraying, for example by flame spraying or electrodeposition. Further, since electron beam welding produces relatively little distortion or dimensional change, the coating needs very little treatment to produce the required groove dimensions after the parts are welded together. In contrast, it is quite difficult to apply a uniform wear-resistant coating to the side faces of a groove in a completed piston, since the thickness of the coating tends to decrease markedly towards the radially inner parts of the side faces. This coating therefore requires a considerable amount of machining to produce a desired uniform groove profile.

The two-part construction of the methods of the present invention can additionally be exploited to provide coolant cavities.

It will be appreciated that many variations of the described methods are possible, in addition to the variations already mentioned. Thus in some circumstances it may be sufficient to apply a wear-resistant coating to only one side face of the or each groove, and suitable ceramic materials could be used for the coating. Further, the part of the piston containing the head end thereof could be made from a material having a higher resistance to temperature than the remainder of the piston: for example, the part 14 of FIG. 3 could be made of a high temperature resistant material. Finally, the piston could be used in applications other than internal combustion engines, for example in steam engines, pumps or compressors.

We claim:

1. A method of manufacturing a light metal piston having a circumferentially extending piston ring groove, which method comprises the steps of
   producing a main cylindrical piston part having a reduced diameter portion at its head end, and an annular piston part adapted to fit over said reduced diameter portion, with each of said parts having a lateral surface defining substantially the whole of one side of said piston ring groove when said annular piston part is fitted onto said cylindrical piston part in a predetermined position relative thereto,
   spraying a wear-resistant coating material onto at least one of said lateral surfaces before said parts are fitted together, and
   subsequently fitting said parts together in said predetermined position, and electron beam welding them to each other.

2. A method as claimed in claim 1 in which said reduced diameter portion is frusto-conical and tapers inwardly toward the head of said piston.

3. A method as claimed in claim 1 in which said parts have surfaces which mate when said parts are brought into said predetermined position, said mating surfaces including portions which intersect the external surface of the piston but do not intersect the piston ring groove.

4. A method as claimed in claim 1, wherein the wear resistant coating is applied to both side faces of the groove.

5. A method as claimed in claim 1, wherein the annular piston part is of a material having a higher resistance to temperature than the remainder of the piston.

6. A method of manufacturing a light metal piston having a plurality of circumferentially extending piston ring grooves therein, which method comprises the steps of
  producing a main cylindrical piston part having a reduced diameter portion at its head, and as many annular piston parts adapted to fit over said reduced diameter portion as there are piston ring grooves, with each of said parts having at least one lateral surface defining substantially the whole of one side of a piston groove and each piston groove being defined by surfaces on two different parts when said annular piston parts are fitted onto said cylindrical piston part in predetermined positions relative to the other parts,
  spraying a wear-resistant coating material onto at least one of the lateral surfaces defining each groove before said parts are fitted together, and
  subsequently fitting all of said parts together in said predetermined position, and electron-beam welding them to each other.

7. A method as claimed in claim 6 in which the wear-resistant coating is applied to the side of each groove nearest the head of the piston.

\* \* \* \* \*